(12) United States Patent
Li et al.

(10) Patent No.: US 10,097,022 B2
(45) Date of Patent: Oct. 9, 2018

(54) MOBILE TERMINAL AND RAPID CHARGING METHOD

(71) Applicant: HISENSE MOBILE COMMUNICATIONS TECHNOLOGY CO., LTD., Qingdao (CN)

(72) Inventors: Chunqian Li, Qingdao (CN); Yufeng Zhao, Qingdao (CN); Wenjuan Du, Qingdao (CN); Maoxue Yu, Qingdao (CN)

(73) Assignees: HISENSE MOBILE COMMUNICATIONS TECHNOLOGY CO., LTD., Shandong (CN); HISENSE USA CORPORATION, Suwanee, GA (US); HISENSE INTERNATIONAL CO., LTD., Shandong (CN)

( * ) Notice: Subject to any disclaimer, the term of this patent is extended or adjusted under 35 U.S.C. 154(b) by 218 days.

(21) Appl. No.: 15/076,832

(22) Filed: Mar. 22, 2016

(65) Prior Publication Data

US 2017/0040821 A1    Feb. 9, 2017

(30) Foreign Application Priority Data

Aug. 5, 2015    (CN) .......................... 2015 1 0473321

(51) Int. Cl.
*H02J 7/00*    (2006.01)
(52) U.S. Cl.
CPC .......... *H02J 7/0057* (2013.01); *H02J 7/0004* (2013.01); *H02J 7/0045* (2013.01); *H02J 7/0052* (2013.01);

(Continued)

(58) Field of Classification Search
USPC ........................................ 320/107, 114, 162
See application file for complete search history.

(56) References Cited

U.S. PATENT DOCUMENTS

| 7,528,574 | B1 | 5/2009 | Adkins et al. |
| 9,197,086 | B2 | 11/2015 | Zhou et al. |
| (Continued) | | | |

FOREIGN PATENT DOCUMENTS

| CN | 201590668 | | 9/2010 |
| CN | 103236568 | A | 8/2013 |
| (Continued) | | | |

OTHER PUBLICATIONS

Office Action from corresponding Chinese Application No. 201510473321.8 dated Sep. 26, 2017 (5 pages).

(Continued)

*Primary Examiner* — Brian Ngo
(74) *Attorney, Agent, or Firm* — Harness, Dickey & Pierce, P.L.C.

(57) ABSTRACT

The application discloses a rapid charging method and a mobile terminal, which are proposed for a power source adaptor outputting dynamically adjustable voltage, where voltage of a battery core is divided into several intervals, and further in a segmented constant-current-like charging mode, a volt value of charging voltage output by the power source adaptor is adjusted dynamically according to an interval in which the core voltage of the battery in the mobile terminal while the battery is being charged lies, and the battery is DC-charged directly using the charging voltage output by the power source adaptor.

11 Claims, 5 Drawing Sheets

(52) U.S. Cl.
CPC ..... *H02J 7/0081* (2013.01); *H02J 2007/0062* (2013.01)

(56) References Cited

U.S. PATENT DOCUMENTS

| | | | |
|---|---|---|---|
| 9,300,159 B2 | 3/2016 | Sun et al. | |
| 2005/0001590 A1 | 1/2005 | Bayne et al. | |
| 2007/0188134 A1 | 8/2007 | Hussain et al. | |
| 2008/0061733 A1 | 3/2008 | Toya | |
| 2008/0100143 A1 | 5/2008 | Lipcsei | |
| 2009/0184687 A1 | 7/2009 | Schroeder et al. | |
| 2010/0115147 A1 | 5/2010 | Kim | |
| 2011/0279078 A1* | 11/2011 | Hara | H02J 7/027 320/107 |
| 2014/0015507 A1 | 1/2014 | Park et al. | |
| 2014/0167706 A1 | 6/2014 | Sun et al. | |
| 2014/0203761 A1 | 7/2014 | Paparrizos et al. | |
| 2016/0094084 A1* | 3/2016 | Sotani | H02J 7/35 320/101 |
| 2016/0214500 A1 | 7/2016 | Kim et al. | |
| 2016/0261127 A1 | 9/2016 | Worry et al. | |
| 2016/0336779 A1 | 11/2016 | Hu et al. | |
| 2016/0352132 A1* | 12/2016 | Zhang | H02J 7/0029 |
| 2017/0040804 A1 | 2/2017 | Hu et al. | |
| 2017/0040805 A1* | 2/2017 | Huang | H02J 7/022 |
| 2017/0040810 A1 | 2/2017 | Hu et al. | |
| 2017/0040812 A1 | 2/2017 | Li et al. | |
| 2017/0040821 A1 | 2/2017 | Li et al. | |
| 2017/0066342 A1 | 3/2017 | Butler et al. | |

FOREIGN PATENT DOCUMENTS

| | | |
|---|---|---|
| CN | 103872398 | 6/2014 |
| CN | 102880238 | 7/2015 |
| CN | 104796011 | 7/2015 |
| JP | 2007267498 | 10/2007 |
| WO | 2012086788 | 6/2012 |

OTHER PUBLICATIONS

Office Action from corresponding Chinese Application No. 201510473321.8, dated Oct. 8, 2016 (4 pages).

Office Action from corresponding Chinese Application No. 201510473321.8, dated Jun. 15, 2017 (5 pages).

Office Action from related Chinese Application No. 201510473427.8, dated Oct. 27, 2016 (8 pages).

Office Action from related Chinese Application No. 201510473427.8, dated May 17, 2017 (8 pages).

Office Action from related Chinese Application No. 201510473429.7, dated Dec. 8, 2016 (9 pages).

Office Action from related Chinese Application No. 201510473429.7, dated Aug. 1, 2017 (8 pages).

Office Action from related Chinese Application No. 201510473336.4, dated Jan. 4, 2017 (10 pages).

* cited by examiner

MOBILE TERMINAL AND RAPID CHARGING METHOD

CROSS-REFERENCE TO RELATED APPLICATION

This application claims the benefit and priority of Chinese Patent Application No. 201510473321.8 filed Aug. 5, 2015. The entire disclosure of the above application is incorporated herein by reference.

FIELD

The present disclosure relates to the field of Direct-Current (DC) charging.

BACKGROUND

This section provides background information related to the present disclosure which is not necessarily prior art.

At present, mobile terminals have been widely applied in numerous aspects of people's life, and have become a leading factor in the development of the semiconductor industry. The majority of the existing mobile terminals are provided with chargeable batteries to power system circuits in the mobile terminals. As an increasing number of functions supported by the portal mobile terminals are emerging, their system circuits also consume more and more power, and given a limited capacity of the batteries, the mobile terminals operate for a shorter and shorter period of time after the batteries are charged, so that the batteries have to be charged more and more frequently.

SUMMARY

This section provides a general summary of the disclosure, and is not a comprehensive disclosure of its full scope or all of its features.

An embodiment of the application provides a mobile terminal including a battery, a USB interface, and a microprocessor, wherein the battery is configured to store electric energy; the USB interface is configured to be connected with a DC-charging power source adaptor; and the microprocessor is configured to detect voltage of the battery upon detecting that the USB interface is connected with the DC-charging power source adaptor, and if the voltage of the battery lies in a range [S1, S2] delimited by preset DC-charging thresholds, to search, using an interval in which the voltage of the battery lies, a preset reference table for a target charging voltage value $V_{out}$ corresponding to the interval, to send the target charging voltage value $V_{out}$ to the DC-charging power source adaptor, and to control the charging voltage output by the DC-charging power source adaptor to DC-charge the battery, wherein the charging voltage is target charging voltage adjusted and output by the DC-charging power source adaptor according to the received target charging voltage value $V_{out}$.

An embodiment of the application further provides a rapid charging method including: detecting, by a mobile terminal, voltage of a battery thereof; if the voltage of the battery lies in a range [S1, S2] delimited by preset DC-charging thresholds, then searching, using an interval in which the voltage of the battery lies, a preset reference table for a target charging voltage value $V_{out}$ corresponding to the interval, and sending the target charging voltage value $V_{out}$ to a DC-charging power source adaptor; and transferring, by the mobile terminal, received charging voltage output by the DC-charging power source adaptor to the battery to DC-charge the battery, wherein the charging voltage is target charging voltage adjusted and output by the DC-charging power source adaptor according to the received target charging voltage value $V_{out}$.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

The drawings described herein are for illustrative purposes only of selected embodiments and not all possible implementations, and are not intended to limit the scope of the present disclosure.

In the application, in order to make full use of such a characteristic of the DC-charging power adaptor that the output voltage thereof is dynamically adjustable, to thereby significantly speed up charging, firstly a mobile terminal in which a chargeable battery is built is adapted in hardware to enable the mobile terminal to support both a normal charging mode in which the battery is charged by a power source managing chip in the mobile terminal, and a DC-charging mode in which a charging power source is transferred directly to the battery to DC-charge the battery at large current. Then software program is designed for the adapted hardware circuits to adjust dynamically the charging voltage output by the DC-charging power adaptor, and to control the mobile terminal to enter the different charging modes, in response to the real-time change in voltage of the battery core being charged, so as to make reasonable use of the charging power source and to shorten the period of time for charging the battery.

Firstly hardware configurations of the mobile terminal and the DC-charging power source adaptor will be described below with reference to FIG. 1.

Figure 1:
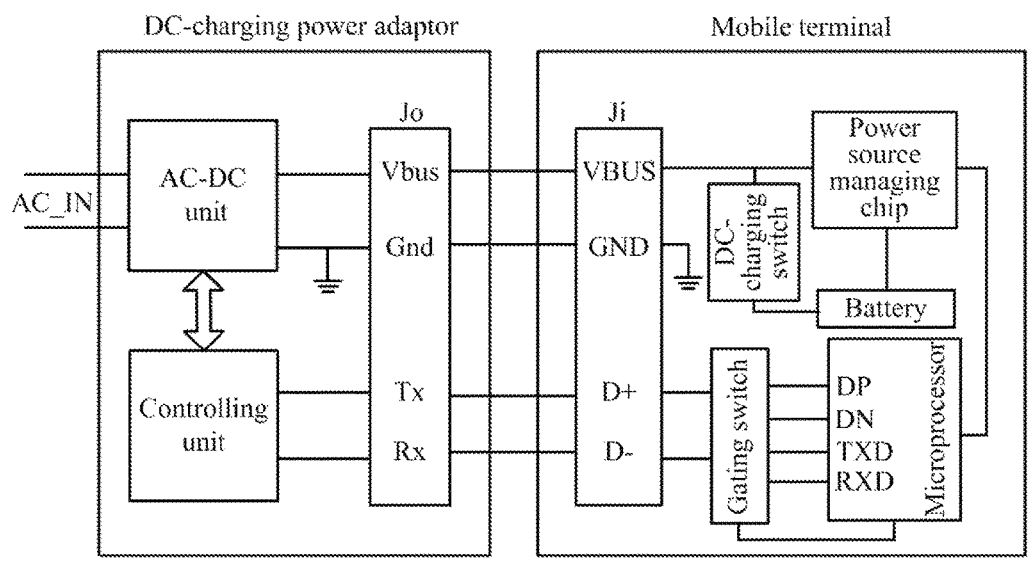
FIG. 1 is a circuit scheme block diagram of an embodiment of a mobile terminal connected with a DC-charging power source adaptor according to the application.

As illustrated in FIG. 1, in order to maintain the existing traditional charging function of the mobile terminal so that the mobile terminal can be normally engaged with and charged by the existing host computer and normal power source adaptor, the existing charging interface of the mobile terminal is maintained in this embodiment, i.e., an interface reused for both charging and transmitting data, e.g., the currently widely applied USB interface Ji, so that the mobile terminal can be engaged with and powered by the normal power source adaptor and computer host computer in the market, which are currently manufactured by the majority of the manufactures. For the power pin VBUS in the USB interface Ji, in this embodiment, one end thereof is connected with a power source managing chip in the mobile terminal, and another end thereof is connected with the battery through a DC-charging switch, which can be any type of controllable switch element with low conduction impedance through which large current can pass, e.g., controllable silicon, an MOS transistor, etc., to receive a switch control signal output by a microprocessor in the mobile terminal to selectively switch between the normal charging mode and the rapid charging mode. For the ground pin GND in the USB interface Ji, it can be well connected with a system ground of the mobile terminal so that the mobile terminal can be grounded together with the external device if the mobile terminal is engaged with the external device. The differential data pins D+ and D− in the USB interface Ji are designed to be connected with the microprocessor through a gating switch, which can be a double-pole double-throw switch, to receive a control signal output by the microprocessor, where the differential data pins D+ and D− of the USB interface Ji are connected by default with the differential data interfaces DP and DN of the microprocessor through the gating switch; and if it is detected that the externally connected charging device is neither the host computer nor the normal power source adaptor, then the gating switch will be controlled by the microprocessor to switch the differential data pins D+ and D− of the USB interface Ji to be connected with the Universal Asynchronous Receiver and Transmitter (UART) interfaces TXD and RXD of the microprocessor to thereby identify in the UART communication mode whether the inserted external device is the DC-charging power source adaptor.

Particularly the microprocessor in the mobile terminal can be designed to initiate a communication command to the externally connected charging device in the UART communication mode after the differential data pins D+ and D− of the USB interface Ji are switched to be connected with the UART interfaces TXD and RXD of the microprocessor, and if a valid command fed back by the external charging device is received, to determine that the inserted external device is the DC-charging power source adaptor; or if there is no valid command fed back, to disconnect the UART interfaces TXD and RXD of the microprocessor from the differential data pins D+ and D− of the USB interface Ji without starting the charging mode, or to further output an alert "Inserted Device Can Not Be Identified".

In this embodiment, the DC-charging power source adaptor is configured in the UART communication mode instead of the I$^2$C bus communication mode for the reason that there is small communication traffic, a low rate, and a high anti-interference capability of UART communication in the asynchronous communication mode to thereby avoid effectively communication between the mobile terminal and the power source adaptor from becoming highly instable due to interference from current, impedance, voltage, and other signals so that the mobile terminal can be charged stably and rapidly at large current by the DC-charging power adaptor to thereby improve the safety of the mobile terminal being charged.

Of course, communication between the mobile terminal and the DC-charging power adaptor can alternatively be designed in another communication mode than UART (e.g., the I$^2$C bus communication mode, etc.). For non-limited example, the mobile terminal and the DC-charging power adaptor can be designed to exchange data in wireless communication with each other. Particularly, matching wireless communication modules, e.g., Bluetooth modules, Wi-Fi modules, etc., can be arranged respectively in the mobile terminal and the DC-charging power adaptor, and if the mobile terminal needs to exchange communication instructions with the DC-charging power adaptor, then the communication instructions generated by the mobile terminal and the DC-charging power source adaptor can be sent to the wireless communication modules for conversion into wireless signals and then sent to the opposite wireless communication modules, so that such a difference in ground level between the power source adaptor and the mobile terminal can be addressed that arises from a significant voltage drop across a charging line between the power source adaptor and the mobile terminal being charged at large current, where the difference in ground level would otherwise have degraded a quality of waveform of the communication signal, thus resulting in the instability of communication.

With the mobile terminal adapted in hardware as described above, the rapid charging method according to this embodiment will be described below with reference to FIG. 2 to FIG. 5.

Figure 2:
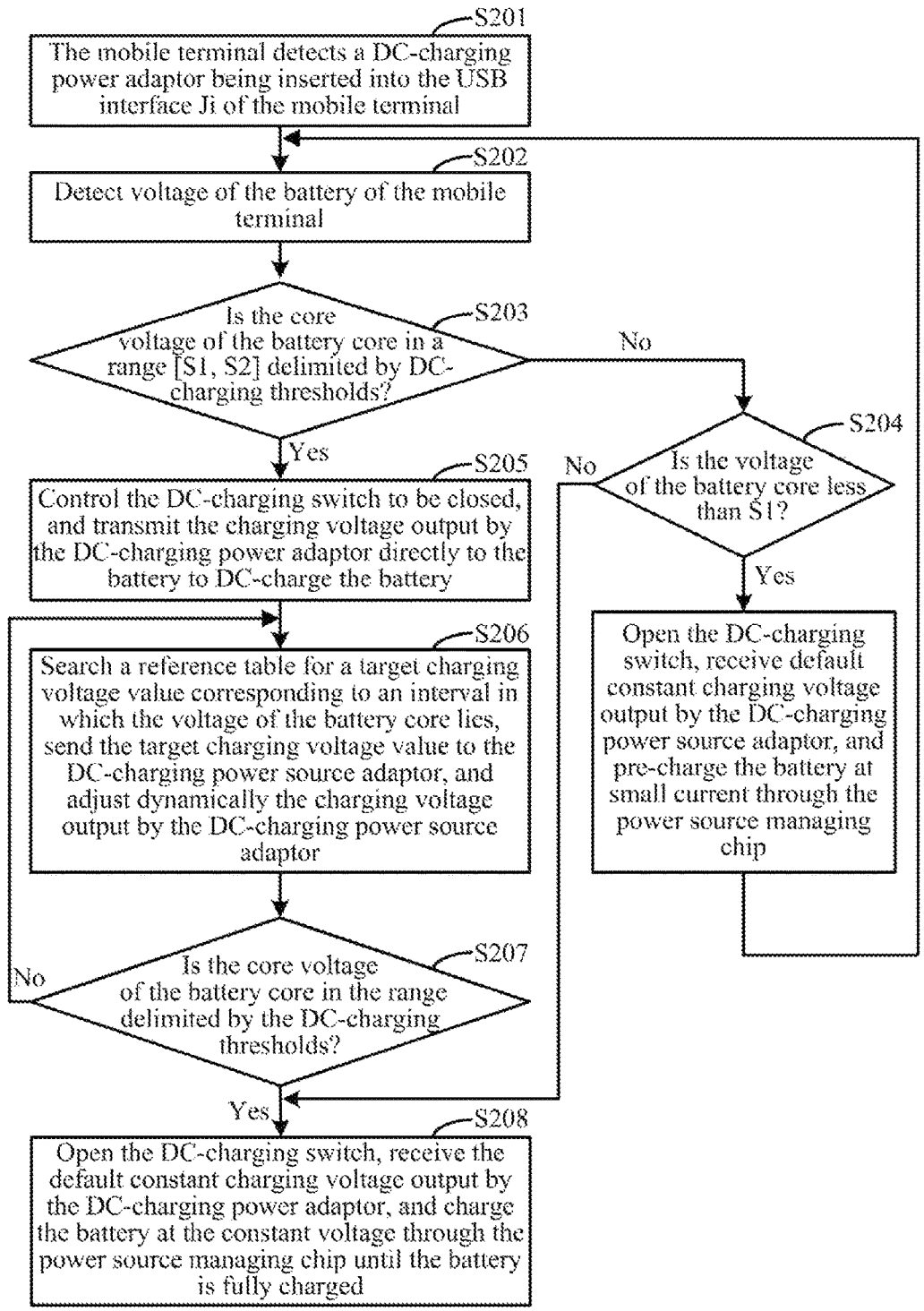
FIG. 2 is a flow chart of a process of an embodiment of a rapid charging method according to the application.

As illustrated in FIG. 2, the rapid charging method generally involves the following steps:

S201. The mobile terminal detects a DC-charging power adaptor being inserted into the USB interface Ji thereof, and performs subsequent steps upon detecting a DC-charging power adaptor being inserted.

In this embodiment, the DC-charging power adaptor can be configured to output by default the same constant charging voltage as the charging voltage provided by the host computer and the normal power source adaptor, e.g., 5V constant charging voltage, to thereby accommodate an input power source as required for the power source managing chip in the mobile terminal.

Of course, the 5V constant charging voltage here only relates to an embodiment, and for some mobile terminal to be charged at constant voltage of another volt value, the DC-charging power adaptor will be simply configured to output by default the same constant charging voltage as the charging voltage output by the normal power source adaptor when the normal power source adaptor powers the mobile terminal.

S202. The mobile terminal detects voltage of the battery thereof;

In this embodiment, the voltage of the battery refers to voltage of a battery core.

S203. It is determined whether the voltage of the battery core is in a range [S1, S2] delimited by DC-charging thresholds, and if so, then the flow proceeds to the step S205; otherwise, the flow proceeds to the step S204.

In this embodiment, the DC-charging thresholds (a lower voltage threshold S1 and an upper voltage threshold S2) can be determined particularly dependent upon the real condition of the battery to possibly agree with the voltage range of the battery corresponding to the constant-current charging phase in the normal Dedicated Charging Port (DCP) charging mode (i.e., the traditional charging mode in which the battery is charged by the normal power source adaptor). For non-limited example, the lower voltage threshold S1 and the upper voltage threshold S2 of a 4.2V chargeable battery can be set to S1=3.5V and S2=4.1V.

S204. It is determined whether the voltage of the battery core is less than S1, and if so, then the DC-charging switch is controlled to be kept in an Off state, and also the power source managing chip is started to receive the constant charging voltage provided by the DC-charging power adaptor, e.g., DC 5V charging voltage, to pre-charge the battery at small current, and the flow returns to the step S202; otherwise, the flow jumps to the step S208.

S205. The mobile terminal controls the DC-charging switch to be closed to short the power source managing chip so that the power source managing chip stops operating, and transfers the charging voltage output by the DC-charging power adaptor directly to the battery to DC-charge the battery.

S206. The mobile terminal communicates with the DC-charging power adaptor, and adjusts dynamically the charging voltage output by the DC-charging power source adaptor according to the varying voltage of the battery core.

Figure 3:
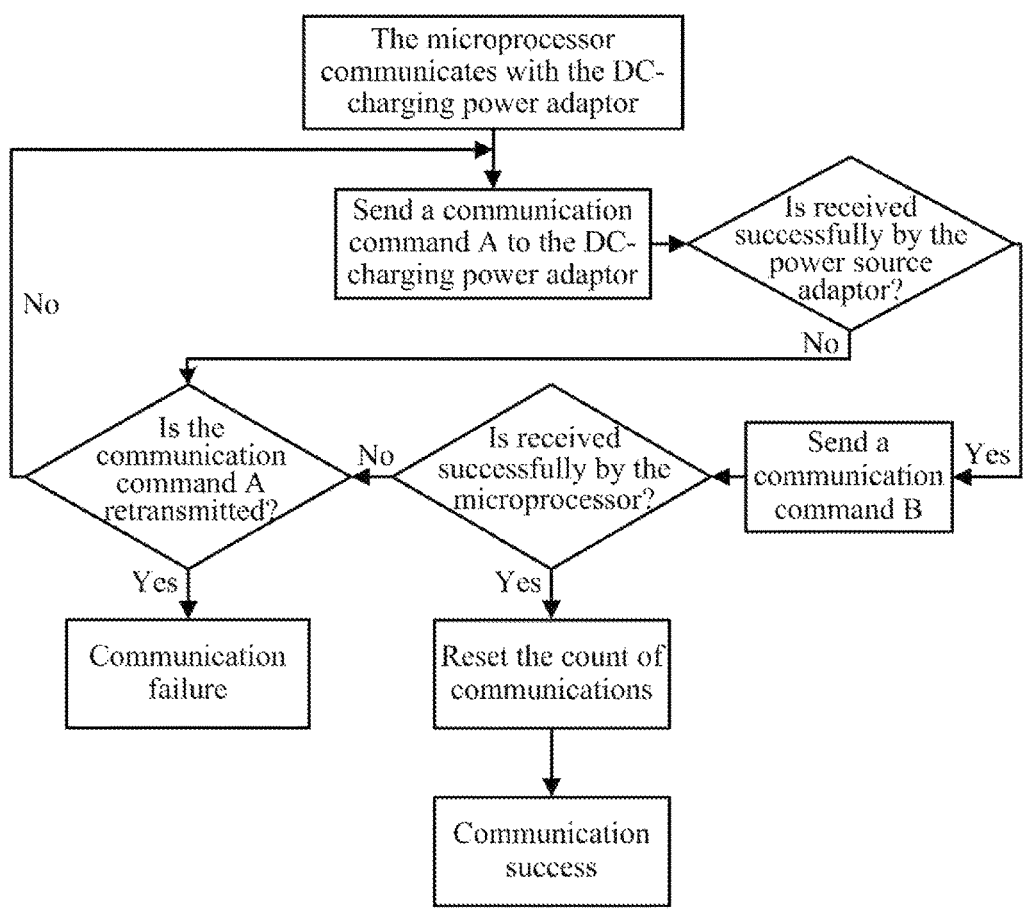
FIG. 3 is a flow chart of an embodiment of detecting communication between the mobile terminal and the DC-charging power source adaptor illustrated in FIG. 1 according to the application.

Communication between the mobile terminal and the DC-charging power source adaptor can be detected in this embodiment in the following flow illustrated in FIG. 3: the microprocessor initiates a communication command A to the external power source adaptor after switching the communication interfaces of the microprocessor from the differential data interfaces DP and DN to the UART interfaces TXD and RXD, and also counts the number of communications. The DC-charging power adaptor receiving successfully the communication command A can respond accordingly, and send a communication command B to the mobile terminal, and if the mobile terminal does not receive any valid communication command B, then the microprocessor will firstly determine the count of communications at that time, and if the count of communications is less than 2, then the microprocessor will retransmits the communication command A for a second attempt on communication; and if the count of communications is more than or equal to 2, then the microprocessor will determine that the communication fails, disconnect the communication pins D+ and D− of the charging interface thereof from the UART interfaces TXD and RXD of the microprocessor, and resume the original state in which the communication pins D+ and D− of the charging interface are connected with the differential data pins DP and DN of the microprocessor. If the mobile terminal receives successfully the communication command B, then the microprocessor will determine that the communication succeeds, and reset the count of communications, and thereafter can start a timed communication detection mechanism as illustrated in FIG. 4.

In the timed communication detection mechanism, the mobile terminal is timed to send a handshake instruction, e.g., a communication instruction C, to the DC-charging power adaptor, and also increments the count of communications by one; and if the DC-charging power adaptor receives successfully the communication instruction C, then it will feed immediately a response instruction back to the mobile terminal, for non-limited example, it will send a communication instruction D to the mobile terminal. If the mobile terminal receives successfully the communication instruction D, then the handshake succeeds, and the mobile terminal determines that the communication between them is normal, maintains the current charging process, resets the count of communications, and waits for arrival of a next timed detection period and then initiates again the communication instruction C. If the mobile terminal does not receive the communication instruction D, then the mobile terminal will retransmit the communication instruction C to the DC-charging power adaptor, and if both of the communications fail, then the mobile terminal will determine that the DC-charging power adaptor engaged therewith becomes abnormal. In order to ensure the safety of the mobile terminal, at this time the microprocessor has the connection line between the USB interface Ji of the mobile terminal and the internal system circuits thereof disconnected, and notifies the user of the abnormality of the externally connected power source adaptor to thereby alert the user.

For the DC-charging power source adaptor designed in the wireless communication mode, the mobile terminal detecting that the inserted external device is neither the host computer nor the normal power source adaptor starts the wireless communication module through the microprocessor to communicate wirelessly with the external charging device to thereby determine whether the inserted external device is the DC-charging power source adaptor. The communication detection flow can also be performed as illustrated in FIG. 3 except that the communication commands A and B are transmitted wirelessly.

Figure 4:
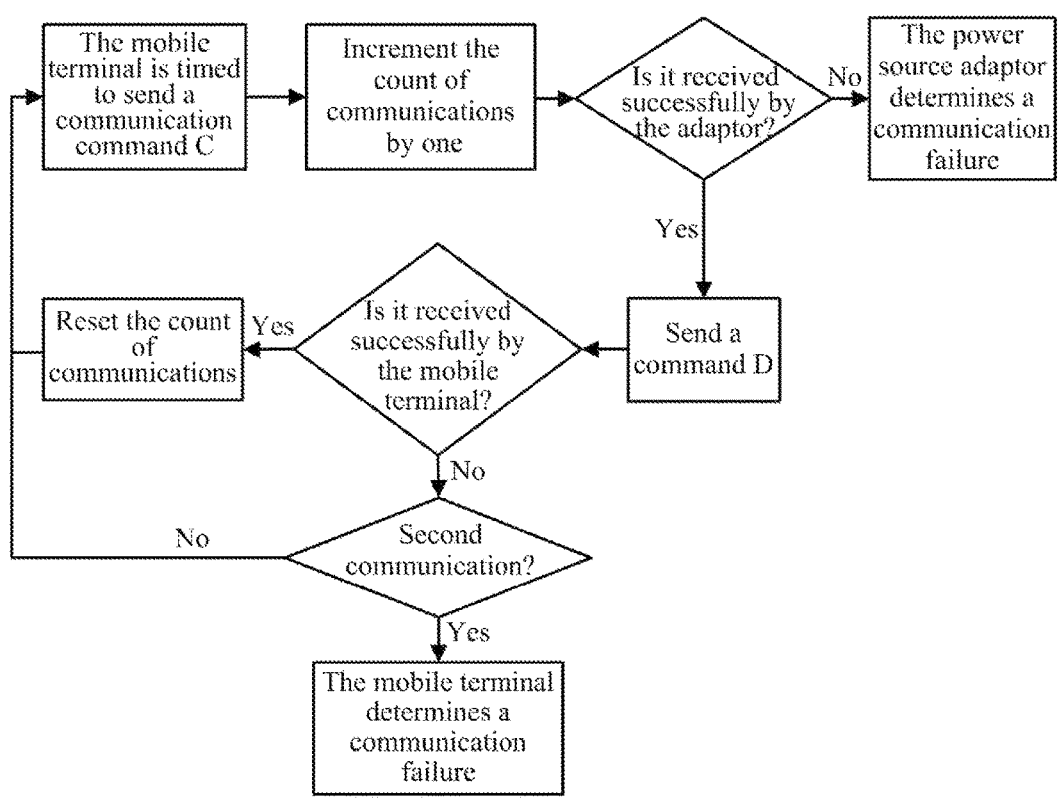
FIG. 4 is a flow chart of an embodiment of a timed detection mechanism of communication between the mobile terminal and the DC-charging power source adaptor illustrated in FIG. 1 according to the application.

The mobile terminal detecting that the inserted external device is the DC-charging power source adaptor can also start the timed communication detection mechanism as illustrated in FIG. 4 for a better switching mechanism and error tolerant mechanism.

In this embodiment, the charging voltage can be adjusted dynamically as follows:

A relationship reference table between the voltage of the battery core and the target charging voltage is preset in the mobile terminal, the voltage of the battery core is detected, and the reference table is searched using the core voltage for the target charging voltage corresponding to the core voltage to control the voltage output of the DC-charging power adaptor.

The voltage of the battery core can be divided into several intervals according to the range [S1, S2] delimited by the DC-charging thresholds, for non-limited example, the core voltage is divided into N intervals at a step of 100 mV, where N=(S2−S1)/100 mV. For each interval, a target charging voltage value $V_{out}$, a target charging current value $I_{targ}$, and a charging current maximum value $I_{max}$ corresponding to the core voltage in the interval are predetermined, and the reference table is created and stored in the microprocessor, or in a memory in the mobile terminal, connected with the microprocessor for invoking by the microprocessor.

Figure 5:
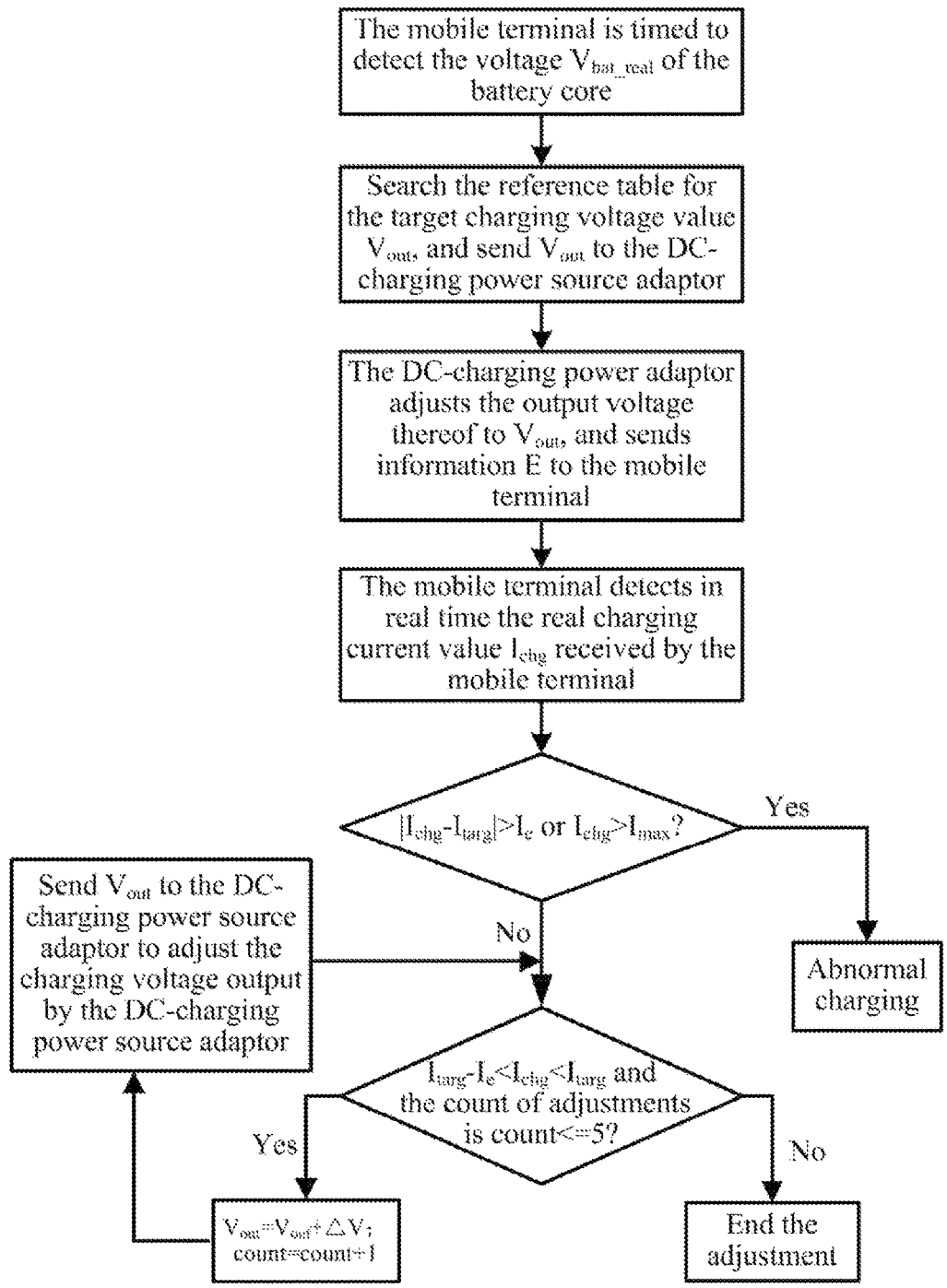
FIG. 5 is a flow chart of control in an embodiment of a DC-charging control strategy using a lookup table according to the application.

After entering the DC-charging process, as illustrated in FIG. 5, the microprocessor is timed to detect the core voltage $V_{bat\_real}$ of the battery, searches the reference table using the detected core voltage $V_{bat\_real}$, determines the core voltage interval in which the core voltage $V_{bat\_real}$ lies, and then searches using the determined interval for the target charging voltage value $V_{out}$, the target charging current value $I_{targ}$, and the charging current maximum value $I_{max}$ corresponding to the interval. Thereafter the microprocessor conducts communication with the DC-charging power adaptor, and sends the target charging voltage value $V_{out}$, the target charging current value $I_{targ}$, and the charging current maximum value $I_{max}$ to the DC-charging power adaptor.

The charging current maximum value $I_{max}$ can be determined from the maximum terminal voltage supported by the battery, and an inner resistance of the battery; the target charging current value $I_{targ}$ can be determined from the charging current maximum value $I_{max}$; and the target charging voltage value $V_{out}$ can be determined from the target charging current value $I_{targ}$ as well as a resistance value on the charging line, a resistance value on a circuit board of the mobile terminal, and the inner resistance of the battery.

At the DC-charging power adaptor side, the DC-charging power adaptor adjusts the charging voltage output by the AC-DC unit thereof to the received target charging voltage value $V_{out}$ according to the target charging voltage value $V_{out}$. At the end of the adjusting, the DC-charging power adaptor sends information E to the mobile terminal.

At the mobile terminal side, the mobile terminal detects in real time a received real charging current value $I_{chg}$. If $|I_{chg}-I_{targ}| \le I_e$ and $I_{chg} \le I_{max}$, then the charging voltage adjusted and then output by the DC-charging power source adaptor will be transferred directly to the battery to DC-charge the battery in the mobile terminal at large current, where the charging current here can rise beyond 3500 mA, for non-limited example, to thereby significantly speed up charging. Here $I_e$ represents a controllable range of the difference between the real charging current value of the DC-charging power adaptor and the target charging current value, and in this embodiment, $I_e$ can be set to $I_e$=500 mA, for non-limited example. If $|I_{chg}-I_{targ}|>I_e$ or $I_{chg}>I_{max}$, then abnormal charging will be determined. At this time, in order to ensure the safety in charging, the mobile terminal stops the charging process or instructs the DC-charging power source adaptor to block the charging power source output by the AC-DC unit thereof to stop the mobile terminal from being charged to thereby avoid the mobile terminal from being damaged.

An implementation of the particular scheme to create the reference table is proposed in this embodiment:

A number i of intervals, denoted as $x_{i1} \sim x_{i2}$, are set for the core voltage in the range of [S1, S2];

For each of the intervals [$x_{i1}$, $x_{i2}$], a target charging voltage value $V_{out}$, a target charging current value $I_{targ}$, and a charging current maximum value $I_{max}$ corresponding to the interval are calculated respectively in the equations of:

$$V_{out}=V_{bat\_real}+I_{targ}*(R_{line}+R_{board}+R_{bat}) \quad (1)$$

$$I_{targ}=I_{max}-\Delta I \quad (2)$$

$$I_{max}=\min((V_{bat\_max}-V_{bat\_real})/R_{bat}, I_{allow}) \quad (3)$$

Where $R_{line}$ represents the resistance value on the charging line; $R_{board}$ represents the resistance value on the circuit board of the mobile terminal; $R_{bat}$ represents the inner resistance value of the battery, which can be experimentally measured; $V_{bat\_max}$ represents the maximum terminal voltage value supported by the battery, which shall be determined by a hardware platform on which the mobile terminal operates, and which shall be less than a specified safe value $V_{bat\_safe}$ of the terminal voltage of the battery; $I_{allow}$ represents the maximum safe charging current value selected while ensuring the safety of the battery being charged; and $\Delta I$ represents a preset difference in current, which may lie in the range of [150 mA, 250 mA].

The reference table is created from the parameters $V_{bat\_real}$, $V_{out}$, $I_{targ}$ and $I_{max}$.

In this embodiment, in order not to measure $R_{line}$ and $I_{max}$, the sum of the resistance value $R_{line}$ on the charging line, and the resistance value $R_{board}$ on the circuit board of the mobile terminal can be calculated in the equation of:

$$R_{line}+R_{board}=(V_{out}-V_{bat})/I_{chg} \quad (4)$$

Where $V_{bat}$ represents the terminal voltage of the battery. That is, the terminal voltages $V_{bat}$ of the battery, and the charging currents $I_{chg}$, for the different target charging voltage values $V_{out}$ can be measured in reality, and substituted into Equation (4) to calculate the sum of $R_{line}$ and $R_{board}$, which is substituted into Equation (1) to calculate the target charging voltage value $V_{out}$.

In a designed implementation of this embodiment, the target charging voltage value $V_{out}$ and the charging current maximum value $I_{max}$ corresponding to each interval [$x_{i1}$, $x_{i2}$] can be calculated as follows: a lower bound value $x_{i1}$ of the core voltage in the interval is used as $V_{bat\_real}$ and substituted into Equation (1) to calculate the target charging voltage value $V_{out}$ corresponding to the interval; an upper bound value $x_{i2}$ of the core voltage in the interval is used as $V_{bat\_real}$ and substituted into Equation (3) to calculate the charging current maximum value $I_{max}$ corresponding to the interval; and further the target charging current value $I_{targ}$ is derived from calculated $I_{max}$ in Equation (2), and the reference table is created.

By way of an example, still taking the 4.2V chargeable battery as an example, for the system powered by the battery, from the perspective of the safety of voltage to power the device, the terminal voltage $V_{bat}$ of the battery shall not be more than a specific value $V_{bat\_max}$ dependent upon the platform, and less than the specified safe value $V_{bat\_safe}$ of the terminal voltage of the battery. If the safe value $V_{bat\_safe}$ of the terminal voltage of the battery is $V_{bat\_safe}$=4500 mV, then $V_{bat\_max}$=4470 mV can be taken, so the terminal voltage $V_{bat}$ of the battery is $V_{bat}=V_{bat\_real}+I_{chg}*R_{bat} \le 4470$.

From the perspective of the safety of the battery, if the maximum safe charging current value is taken as $I_{allow}$=4000 mA, then the charging current maximum value $I_{max}$ is calculated as follows in Equation (3):

$$I_{max}=\min((4470-V_{bat\_real})/R_{bat}, 4000) \quad (5)$$

If the inner resistance $R_{bat}$ of the battery is $R_{bat}$=100 mΩ, the other impedance is $R_{line}+R_{board}$=100 mΩ, and the range delimited by the DC-charging thresholds of the battery is [3500 mV, 4100 mV] at a step of 100 mV, then the range [3500 mV, 4100 mV] delimited by the DC-charging thresholds can be divided into 6 intervals; an upper bound value of the core voltage in each interval is substituted into Equation (5) to calculate the charging current maximum value $I_{max}$; the target charging current value $I_{targ}$ is derived from calculated $I_{max}$ substituted in Equation (2), and $\Delta I$=200 mA is taken in this embodiment; and a lower bound value of the core voltage in each interval is substituted into Equation (1) to calculate the target charging voltage value $V_{out}$ from calculated $I_{targ}$, so the desirable reference table is created as follows:

| $V_{bat\_real}$ (mV) | $V_{out}$ (mV) | $I_{targ}$ (mA) | $I_{max}$ (mA) |
|---|---|---|---|
| 3500-3600 | 4260 | 3800 | 4000 |
| ... | ... | ... | ... |
| 4000-4100 | 4700 | 3500 | 3700 |

The reference table reflects to some extent the correspondence relationship between the voltage of the battery core, and the charging current and the charging voltage output by the adaptor, but there may be a minor error relative to the real correspondence relationship, so the battery can be experimentally charged so that the charging voltage varying with the varying charging current is recorded, and the values of the parameters in the reference table are adjusted, for non-limited example, the values of the respective parameters in the reference table are adjusted to their ideal values by averaging them.

The target charging voltage obtained by looking up from the table is a theoretical value, and in reality, the inner resistance of the battery, and the impedance on the line may vary with temperature, aging, and other factors, so the real charging current value $I_{chg}$ output by the DC-charging power adaptor deviates to some extent from the target charging current value $I_{targ}$, thus resulting in some influence upon the charging speed. In order to speed up the charging current as much as possible in an allowable range to further speed up charging, in this embodiment, a charging current self-adjusting algorithm is introduced at the mobile terminal side, as illustrated in FIG. 5, that is, after the DC-charging power adaptor adjusts the output voltage to $V_{out}$, the mobile terminal detects in real time the real charging current $I_{chg}$ received by the mobile terminal, and if $I_{targ}-I_e \leq I_{chg} < I_{targ}$, then the target charging voltage value $V_{out}$ is adjusted up by a preset value $\Delta V$ and sends to the DC-charging power source adaptor to boost the charging voltage output by the DC-charging power adaptor. $V_{out}=V_{out}+\Delta V$ can be adjusted progressively so that the real charging current value $I_{chg}$ output by the DC-charging power adaptor approaches progressively the target charging current value $I_{targ}$.

In this embodiment, $V_{out}$ can be adjusted for five times, for non-limited example, by an amount which can be estimated in Equation (1), and if $V_{bat\_real}$ and R (including the inner resistance of the battery, the line resistance, and all the other impedances) are invariable, then $\Delta V=\Delta I*R$. In this embodiment, $\Delta V$ can be set to $\Delta V=10$ mV.

S207. It is determined whether the voltage of the battery core goes beyond the range delimited by the DC-charging thresholds, and if not, then the flow returns to the step S206; otherwise, the flow proceeds to a subsequent step.

S208. The microprocessor controls the DC-charging switch to be opened to disconnect the DC-charging pathway, instructs the DC-charging power adaptor to adjust the output voltage thereof to the default constant charging voltage, e.g., 5V DC-charging voltage, and starts the power source managing chip to receive the constant charging voltage to charge the battery at the constant voltage until the battery is fully charged.

In order to ensure the safety of the mobile terminal being charged, the following charging abnormality handling mechanism will be proposed in this embodiment:

1. At the Mobile Terminal Side (1) The mobile terminal detecting that it is being powered by the DC-charging power adaptor is timed to send a handshake instruction to the DC-charging power adaptor, and waits for a preset period of time until the DC-charging power adaptor feeds back response information, and if the mobile terminal receives the response information, then the handshake succeeds, and the mobile terminal is further charged; otherwise, the mobile terminal determines abnormal charging, disconnects the connection line between the charging interface of the mobile terminal and the system circuit, and notifies the user of the power source adaptor being abnormal;

(2) After entering the DC-charging process, if the mobile terminal detects that the DC-charging power adaptor is pulled out suddenly, then it disconnects the DC-charging pathway between the charging interface of the mobile terminal and the battery, and has the charging interface connected with the power source managing chip;

(3) After entering the DC-charging process, if the mobile terminal detects that the terminal voltage of the battery exceeds the preset threshold (the threshold of the terminal voltage of the 4.2V chargeable battery can be preset to 4.6V), then it disconnects the DC-charging pathway between the charging interface of the mobile terminal and the battery, and instructs the DC-charging power adaptor to switch to outputting the default constant charging voltage, e.g., 5V DC voltage;

(4) After entering the DC-charging process, the mobile terminal detects in real time the received real charging current value $I_{chg}$, and if the absolute value of the difference between $I_{chg}$ and $I_{targ}$ goes beyond the preset controllable range of the difference, then it disconnects the DC-charging pathway between the charging interface of the mobile terminal and the battery, and switches to the power source managing chip to charge the battery; and (5) After entering the DC-charging process, the mobile terminal detects in real time the received real charging current value $I_{chg}$, and if $I_{chg}$ is more than $I_{max}$, then it disconnects the DC-charging pathway between the charging interface of the mobile terminal and the battery, and notifies the user of the power source adaptor being abnormal 2. At the DC-Charging Power Adaptor Side (1) The DC-charging power adaptor after obtaining the target charging voltage value $V_{out}$, the target charging current value $I_{targ}$, and the charging current maximum value $I_{max}$ detects in real time its output real charging current value $I_{chg}$, and if the absolute value of the difference between $I_{chg}$ and $I_{targ}$ goes beyond the preset controllable range of the difference, then the DC-charging power adaptor stops the charging power source from being output, and flicks a lamp to alert the user;

(2) After entering the DC-charging process, the DC-charging power adaptor detects in real time its output real charging current value $I_{chg}$, and if $I_{chg}$ is more than $I_{max}$, then it determines abnormal charging, and disconnects the charging power source from being output to avoid the mobile terminal from being damaged due to being further powered.

The charging method according to the application can be widely applied to a handset, a tablet computer, a notebook computer, a mobile power source, and other mobile terminals so as to satisfy different charging demands of the user.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A mobile terminal, comprising:
   a battery configured to store electrical energy;
   a universal serial bus (USB) interface configured to be operatively connected with a direct current (DC)-charging power source adaptor; and
   a microprocessor configured to:
   detect a voltage of the battery upon detecting that the USB interface is connected with the DC-charging power source adaptor;
   when the voltage of the battery lies in a range [S1, S2] delimited by preset DC-charging thresholds, search, using an interval in which the voltage of the battery lies, a preset reference table for a target charging voltage $V_{out}$ corresponding to the interval;
   send the target charging voltage $V_{out}$ to the DC-charging power source adaptor;
   control a charging voltage output by the DC-charging power source adaptor to DC-charge the battery, wherein the charging voltage is output by the DC-charging power source adaptor according to the received target charging voltage $V_{out}$.

2. The mobile terminal according to claim 1, further comprising:
a DC-charging switch connected between the USB interface and the battery, wherein the microprocessor is configured to control the DC-charging switch to close upon detecting that the voltage of the battery lies in the range [S1, S2] delimited by the preset DC-charging thresholds, to transfer the charging voltage output by the DC-charging power adaptor directly to the battery to DC-charge the battery; and
a power managing chip connected between the USB interface and the battery, wherein the microprocessor is configured to control the power managing chip to receive the charging voltage output by the DC-charging power adaptor and charge the battery upon detecting that the voltage of the battery leaves the range [S1, S2] delimited by the preset DC-charging thresholds.

3. The mobile terminal according to claim 2, wherein the microprocessor is configured to:
upon detecting that the voltage of the battery is less than S1, communicate with the DC-charging power source adaptor to instruct the DC-charging power source adaptor to output a default constant charging voltage, and control the power source managing chip to pre-charge the battery using a small current; or
upon detecting that the voltage of the battery is more than S2, instruct the DC-charging power source adaptor to output the default constant charging voltage and control the power source managing chip to charge the battery using the default constant charging voltage.

4. A rapid charging method executable by a mobile terminal, the method comprising:
detecting a voltage of a battery of the mobile terminal;
when the voltage of the battery lies in a range [S1, S2] delimited by preset DC-charging thresholds, searching, using an interval in which the voltage of the battery lies, a preset reference table for a target charging voltage $V_{out}$ corresponding to the interval, and sending the target charging voltage $V_{out}$ to a DC-charging power source adaptor; and
transferring a received charging voltage output by the DC-charging power source adaptor to the battery to DC-charge the battery, wherein the charging voltage is a target charging voltage adjusted and output by the DC-charging power source adaptor according to the received target charging voltage $V_{out}$.

5. The rapid charging method according to claim 4, further comprising:
searching the reference table for a target charging current $I_{targ}$ corresponding to the interval in which the voltage of the battery lies;
detecting a real charging current $I_{chg}$ received by the mobile terminal; and
when the real charging current $I_{chg}$ is less than the target charging current $I_{targ}$, adding the target charging voltage $V_{out}$ and a preset value $\Delta V$ to calculate an adjusted target charging $V_{out}'$, wherein $V_{out}'$ is a sum of the target charging voltage $V_{out}$ and the preset value $\Delta V$.

6. The rapid charging method according to claim 4, further comprising:
searching the reference table for a target charging current $I_{targ}$ corresponding to the interval in which the voltage of the battery lies;
detecting a real charging current $I_{chg}$ received by the mobile terminal; and
when an absolute value of a difference between the real charging current $I_{chg}$ and the target charging current $I_{targ}$ is more than a preset value $I_e$, stopping charging of the battery, wherein $I_e$ represents a controllable value of the difference between the real charging current $I_{chg}$ and the target charging current $I_{targ}$.

7. The rapid charging method according to claim 4, further comprising:
searching the reference table for a maximum charging current $I_{max}$ corresponding to the interval in which the voltage of the battery lies;
detecting a real charging current $I_{chg}$ received by the mobile terminal; and
when the real charging current $I_{chg}$ is more than the maximum charging current $I_{max}$, stopping charging of the battery.

8. The rapid charging method according to claim 7, wherein:
the maximum charging current $I_{max}$ is determined based on a maximum terminal voltage supported by the battery and an inner resistance of the battery;
the target charging current $I_{targ}$ is determined based on the maximum charging current $I_{max}$; and
the target charging voltage $V_{out}$ is determined based on the target charging current $I_{targ}$, a resistance of a charging line, a resistance of a circuit board of the mobile terminal, and the inner resistance of the battery.

9. The rapid charging method according to claim 8, wherein:
the voltage of the battery is a voltage of a battery core $V_{bat\_real}$; and
$V_{out}$, $I_{targ}$, and $I_{max}$, corresponding to each interval within the range [S1, S2], are calculated according to:

$$I_{max}=\text{a minimum between } (V_{bat\_max}-V_{bat\_real})/R_{bat} \text{ and } I_{allow};$$

$$I_{targ}=I_{max}-\Delta I; \text{ and}$$

$$V_{out}=V_{bat\_real}+I_{targ}*(R_{line}+R_{board}+R_{bat}),$$

where $R_{line}$ represents the resistance of the charging line, $R_{board}$ represents the resistance of the circuit board of the mobile terminal, $R_{bat}$ represents the inner resistance of the battery, $V_{bat\_max}$ represents the maximum terminal voltage supported by the battery, $I_{allow}$ represents a maximum safe charging current selected while ensuring the safety of the battery being charged, and $\Delta I$ represents a preset current difference.

10. The rapid charging method according to claim 9, wherein:
a target charging voltage $V_{out}$ corresponding to a first interval of the intervals within the range [S1, S2] is calculated according to the equation $$V_{out}=V_{bat\_real}+I_{targ}*(R_{line}+R_{board}+R_{bat}),$$

where $V_{bat\_real}$ is equal to a lower bound value $x_{i1}$ of the first interval;
a maximum charging current $I_{max}$ corresponding to the first interval is calculated according to the equation $I_{max}=$a minimum between $(V_{bat\_max}-V_{bat\_real})/R_{bat}$ and $I_{allow}$; and
$V_{bat\_real}$ equals to an upper bound value $x_{i2}$ of the first interval.

11. The rapid charging method according to claim 4, further comprising:

instructing, upon detecting that the voltage of the battery thereof is less than S1, the DC-charging power source adaptor to output a default constant charging voltage, and to transfer the constant charging voltage to a power source managing chip in the mobile terminal, and starting the power source managing chip to pre-charge the battery using a small current; or instructing, upon detecting that the voltage of the battery thereof is more than S2, the DC-charging power source adaptor to output the default constant charging voltage, and to transfer the constant charging voltage to the power source managing chip, and starting the power source managing chip to charge the battery using the constant voltage.

* * * * *